July 15, 1930.  N. D. LEVIN  1,770,650
CONVEYER
Original Filed April 17, 1925    2 Sheets-Sheet 1

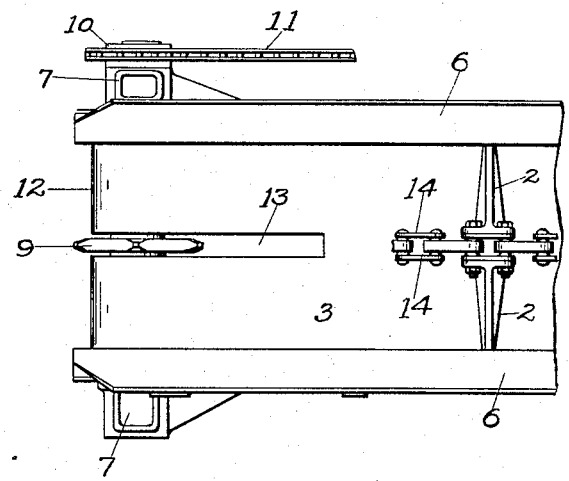
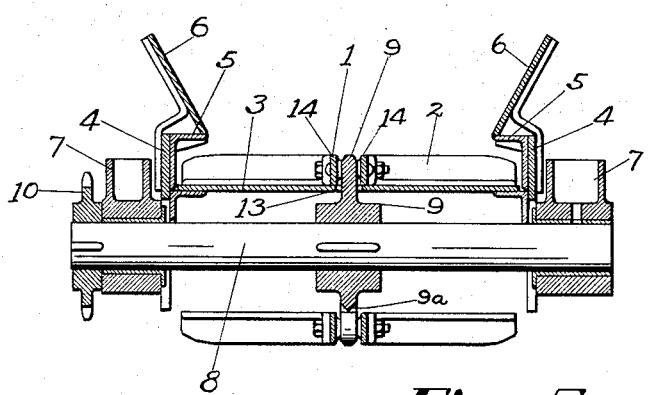

Patented July 15, 1930

1,770,650

UNITED STATES PATENT OFFICE

NILS D. LEVIN, OF COLUMBUS, OHIO, ASSIGNOR TO THE JEFFREY MANUFACTURING COMPANY, OF COLUMBUS, OHIO, A CORPORATION OF OHIO

CONVEYER

Application filed April 17, 1925, Serial No. 23,947. Renewed December 6, 1928.

The present invention relates to certain new and useful improvements in conveyers, and particularly to that class of conveyers wherein loose material is propelled along a conveyer trough by a series of scraper elements attached to an endless chain which travels around suitable wheels positioned adjacent the ends of the trough.

In order that the vertical dimensions of such conveyers may be sufficiently reduced to permit their convenient operation in the restricted space between the floor and roof of a coal mine, the conveyer chain is commonly permitted to slide upon the bottom of the conveyer trough beneath and in contact with the mass of moving coal. As heretofore constructed entrained particles of coal are carried by the conveyer chain and pressed upon the driving sprocket wheels forming accretions thereon which increase the effective diameter of the wheels, thereby destroying their pitch relation with the cooperating chain.

It is the especial object of this invention to provide an improved arrangement of parts whereby the formation of such accretions upon the sprocket wheels is effectively prevented.

The means whereby I attain this object are fully set forth in the following specification, reference being had to the accompanying drawings, of which Fig. 1 is a plan view of the head, or driving, end of a conveyer of the type to which my invention particularly relates.

Fig. 4 is a plan view similar to Fig. 1, wherein part of the conveyer chain is broken away to disclose the peculiar construction of the trough adjacent the driving sprocket wheel.

Fig. 5 is a transverse vertical sectional view taken along the line V—V of Fig. 1.

Like numerals refer to similar parts in the several figures.

Figure 1:
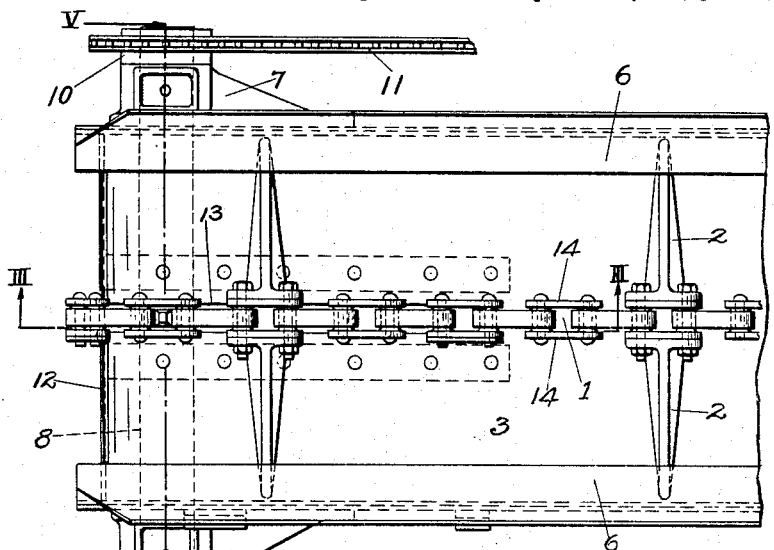

Scraper conveyers adapted to the transmission of loose material along the restricted passages of coal mines, and similar installations, are well understood in the art. In the present application I have shown a fragment of a conveyer of the general type described, including the head or driving end of the conveyer trough, the conveyer chain and flights, and the driving sprocket wheel by which the chain is actuated.

As shown in the drawings, the numeral 1 refers to an endless conveyer chain to which are attached laterally extending scraper elements 2, for propelling material along the conveyer trough. The chain 1 and scrapers 2 are adapted to slide along the plate 3 which constitutes the bottom of the conveyer trough. Attached in any suitable manner to the lateral edges of the plate 3 are side plates 4 to which are secured the guard angles 5 and flaring side plates 6 which constitute the sides of the conveyer trough.

Secured to the side plates 4 adjacent their forward ends are the journal bearings 7 in which are rotatably mounted the head shaft 8 to which is secured the driving sprocket wheel 9 which engages the conveyer chain 1 to drive it. The head shaft 8 may be rotated in any desired manner to actuate the conveyer chain. For purposes of illustration, I have here shown a sprocket wheel 10 and driving chain 11 adapted to be connected with any convenient and suitable source of rotative power.

Figure 2:
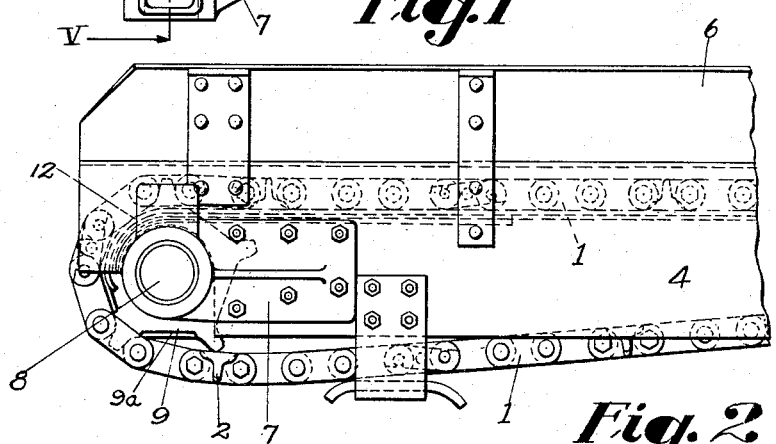
Fig. 2 is a side elevation of the devices illustrated in Fig. 1.
Figure 3:
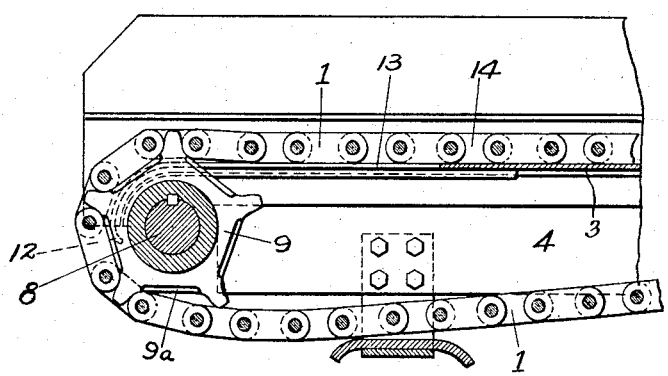
Fig. 3 is a longitudinal sectional view taken along the line III—III of Fig. 1.

At its forward end the bottom plate 3 is bent around the shaft 8, as illustrated at 12 in Figs. 2 and 3 by dotted lines. The curved end 12 of the plate 3 forms a cylindrical surface concentric with the shaft 8 over which the conveyer flights 2 slide smoothly and deliver the material from the conveyer trough, and the sprocket wheel 9 projects through a narrow slot 13 in plate 3 to engage the conveyer chain 1. The width of the slot 13 is sufficient to accommodate the sprocket wheel 9, but is less than the overall width of the conveyer chains 1, so that masses of coal above said chain are prevented from falling through the slot 13, as the coal travels over the slotted bottom at the end of the conveyer trough. However, a considerable amount of fine coal sifts between the side bars 14 of the chain 1, and is carried thereby along the plate 3. To prevent this fine coal, which is carried along by the chain 1 over the plate 3, from being deposited upon the sprocket wheel 9 where the pressure of the chain 1 would cause it to adhere to the rim of the wheel 9, forming accretions thereon, which increase its effective diameter and destroy its pitch relation with the chain, I extend the slot 13 rearwardly along the plate 3 a sufficient distance to permit the final coal traveling beneath the conveyer chain to be discharged through the slot 13 before it reaches the sprocket wheel 9, thereby preventing its contact with and accumulation upon the rim of said sprocket wheel. As a further precaution against the formation of such accretions, I have chamfered the rim of the wheel 9 at 9ª between the sprocket teeth so that this rim presents sloping surfaces over which fragments of coal will slide and also be forced laterally by the pressure of the chain, without adhering to the wheel rim.

Such variations in the structure disclosed as amount to mechanical skill are, of course, to be regarded as within the range of my invention.

I claim:—

1. In a conveyer of the class described, a base plate, a transverse shaft at one end thereof, a wheel on said shaft and projecting through a longitudinally extending slot in said base plate, said slot being extended a substantially short distance inwardly from said wheel, and an open link draft member engaging said wheel and slidable for a portion of its length on said plate, the line of travel of said draft member being coincident with said slot and the width of said slot being less than that of said draft member.

2. In a conveyer of the class described, a base plate, a transverse shaft at one end thereof, a sprocket wheel on said shaft and projecting through a longitudinally extending slot in said base plate, said slot being extended a substantially short distance inwardly from said sprocket wheel, and a link and pintle chain engaging said sprocket wheel and slidable for a portion of its length on said plate, the line of travel of said chain being coincident with said slot, and the margins of said slot being beneath the links of said chain.

3. In a conveyer of the class described, a base plate, a draft member moving over the top of said base plate in the longitudinal direction of the latter, and a wheel supporting a portion of said draft member, the periphery of said wheel extending through a slot in the base plate to engage the draft member, said slot terminating a sufficient distance in advance of said wheel to permit particles of material entrained by the draft member to fall through the slot without fouling the wheel, the width of said slot being less than that of the draft member.

In testimony whereof I have hereunto set my hand.

NILS D. LEVIN.